(12) United States Patent
Garcia Mendoza Sanchez et al.

(10) Patent No.: US 11,522,934 B1
(45) Date of Patent: Dec. 6, 2022

(54) MEDIA PROVIDER SHIM FOR VIRTUAL EVENTS

(71) Applicant: Hopin Ltd, London (GB)

(72) Inventors: Armando Antonio Garcia Mendoza Sanchez, Barcelona (ES); Goncalo Pereira, Parede (PT); Gustavo Garcia, Madrid (ES); Charley Robinson, Denver, CO (US); Thomas Mullen, Ontario (CA)

(73) Assignee: Hopin Ltd, London (GB)

( * ) Notice: Subject to any disclaimer, the term of this patent is extended or adjusted under 35 U.S.C. 154(b) by 0 days.

(21) Appl. No.: 17/583,865

(22) Filed: Jan. 25, 2022

(51) Int. Cl.
*H04L 65/65* (2022.01)
(52) U.S. Cl.
CPC .................................. *H04L 65/65* (2022.05)
(58) Field of Classification Search
CPC ....................................................... H04L 65/65
See application file for complete search history.

(56) References Cited

U.S. PATENT DOCUMENTS

| 9,705,993 B1 * | 7/2017 | Asghari | H04M 3/4933 |
| 10,462,216 B1 * | 10/2019 | Vysotsky | H04L 67/561 |
| 10,944,801 B1 * | 3/2021 | Wang | H04L 67/1068 |

* cited by examiner

*Primary Examiner* — Esther B. Henderson
*Assistant Examiner* — Nazia Naoreen
(74) *Attorney, Agent, or Firm* — Erise IP, P.A.

(57) ABSTRACT

Media, methods, and systems are provided for a shim to enable dynamic selection of RTC during virtual events. A virtual event may be created, and an RTC provider may be selected for the virtual event. A connection request to connect to the RTC provider may be received from a client device. Thereafter, connection data may be signaled to the client device. A signaling message may be received from the client device. The signaling message may be intercepted and translated by the shim. The signaling message may then be transmitted to a signaling server for connecting to the RTC provider. Changes of state of the virtual event may be monitored to determine if a new RTC provider should be leveraged.

20 Claims, 4 Drawing Sheets

MEDIA PROVIDER SHIM FOR VIRTUAL EVENTS

TECHNICAL FIELD

Embodiments of the invention generally relate to virtual events. More specifically, embodiments of the invention relate to shims for virtual events to enable interoperability with multiple RTC providers.

Virtual events may be hosted virtually (i.e., online) by virtual event hosting platforms. The virtual events may be implemented using RTC (Real-Time Communications) that support real-time guarantees of real-time computing. Typically, the virtual events are implemented using WebRTC, a standard for providing real-time communication capabilities in web browsers, mobile devices, and Internet of Things devices via application programming interfaces (APIs). The virtual event hosting platforms may implement RTC natively and/or utilize an external RTC provider for facilitating communications between virtual event participants. When using an external RTC provider, the virtual event hosting platform must be able to communicate signaling information to the RTC provider for connecting thereto. External RTC providers may implement RTC using APIs and signaling protocols that may differ from one provider to the next. Consequently, facilitating interoperation between multiple RTC providers presents myriad difficulties and inefficiencies for virtual event hosting platforms.

Typically, a client system running a virtual event hosting platform is configured to interact with a single or a small subset of external RTC providers. Leveraging a different RTC provider that the client system does not know how to communicate with may result in a failed connection to the RTC provider. Further, different RTC providers commonly have different connection models, such that a client implementing a connection model for the first RTC provider may not maintain the correct state to connect to the second RTC provider without completely rewriting the client to connect to and/or communicate with the second RTC provider. This method of switching RTC providers presents inefficiencies in having to rewrite the client along with a poor experience for a virtual event organizer who cannot dynamically scale virtual events by switching RTC providers dynamically and/or dividing participants among different RTC providers.

What is needed are systems and methods for facilitating interoperation between different RTC providers for virtual events. Furthermore, what is needed are systems and methods for dynamically switching RTC providers during a virtual event without having to rewrite the client system.

SUMMARY

Embodiments of the invention address the above-identified need by providing mechanisms for dynamic switching between various RTC providers using a shim. A virtual event organizer may create a virtual event hosted by a virtual event hosting platform. A shim may be provided for the virtual event hosting platform. An RTC provider may be selected for the virtual event. When a virtual event participant wishes to participate (e.g., share audio/video data), the virtual event participant may request to connect to the RTC provider. Thereafter, connection details for connecting to the RTC provider may be communicated to the virtual event participant. When the virtual event participant transmits a signaling message for the virtual event, the connection offer may be intercepted by the shim layer. The shim may translate the signaling message from the internal virtual event hosting platform syntax to a syntax used by the RTC provider. The translated signaling message may be sent to the signaling server associated with the RTC provider for connecting the virtual event participant to the RTC provider. In some embodiments, a change of state for the virtual event may be detected. In response to the change of state, a new RTC provider may be selected. Advantageously, by using the shim, the RTC provider may be switched without having to rewrite the virtual event hosting platform, and publishers and virtual event participants may utilize separate platforms for the virtual event.

In particular, a first embodiment is directed to one or more non-transitory computer-readable media storing computer-executable instructions that, when executed by a processor, perform a method of shimming signaling data to enable dynamic selection of WebRTC providers for a virtual event hosted by a virtual event hosting platform, the method comprising providing a shim for the virtual event hosting platform, receiving, from a virtual event organizer, creation of the virtual event, selecting a WebRTC provider for the virtual event, receiving, from a presenter client device, a connection request to connect to the WebRTC provider, in response to receiving the connection request, signaling the presenter client device with connection information for connecting to the WebRTC provider, receiving, from the presenter client device, a signaling message, the signaling message based in part on the connection information, intercepting, by the shim, the signaling message, translating, by the shim, the signaling message from a first syntax to a second syntax to obtain a translated signaling message, transmitting the translated signaling message to a signaling server associated with the WebRTC provider, the signaling server configured to control a connection between the presenter client device and the WebRTC provider, detecting a change of state associated with the virtual event; and in response to detecting the change of state, selecting a new WebRTC provider for the virtual event.

A second embodiment is directed to a system for shimming virtual event data for dynamic selection of WebRTC providers for a virtual event hosted by a virtual event hosting platform, the system comprising a processor and one or more non-transitory computer-readable media storing computer-executable instructions that, when executed by the processor, perform a method for shimming virtual event data for dynamic selection of WebRTC providers for the virtual event hosted by the virtual event hosting platform, the method comprising providing a shim for the virtual event hosting platform, receiving, from a virtual event organizer, creation of the virtual event, receiving, from a presenter client device, a connection request, in response to receiving the connection request, signaling the presenter client device with connection information for connecting to a WebRTC provider, receiving, from the presenter client device, a signaling message, the signaling message based in part on the connection information, intercepting, by the shim, the signaling message, translating, by the shim, the signaling message from a first syntax to a second syntax to obtain a translated signaling message, and transmitting the translated signaling message to a signaling server associated with the WebRTC provider, the signaling server configured to control the connection between the presenter client device and the WebRTC provider.

A third embodiment is directed to a method of shimming virtual event data to enable dynamic selection of WebRTC providers for a virtual event hosted by a virtual event hosting platform, the method comprising providing a shim for the virtual event hosting platform, receiving, from a virtual event organizer, creation of the virtual event, selecting a WebRTC provider for the virtual event, receiving, from a presenter client device of a plurality of presenter client devices, a connection request to connect to the WebRTC provider, in response to receiving the connection request, signaling the presenter client device with connection information for connecting to the WebRTC provider, receiving, from the presenter client device, a signaling message, the signaling message based in part on the connection information, intercepting, by the shim, the signaling message, translating, by the shim, the signaling message from a first syntax to a second syntax to obtain a translated signaling message, and transmitting the translated signaling message to a signaling server associated with the WebRTC provider, the signaling server configured to control the connection between the presenter client device and the WebRTC provider.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
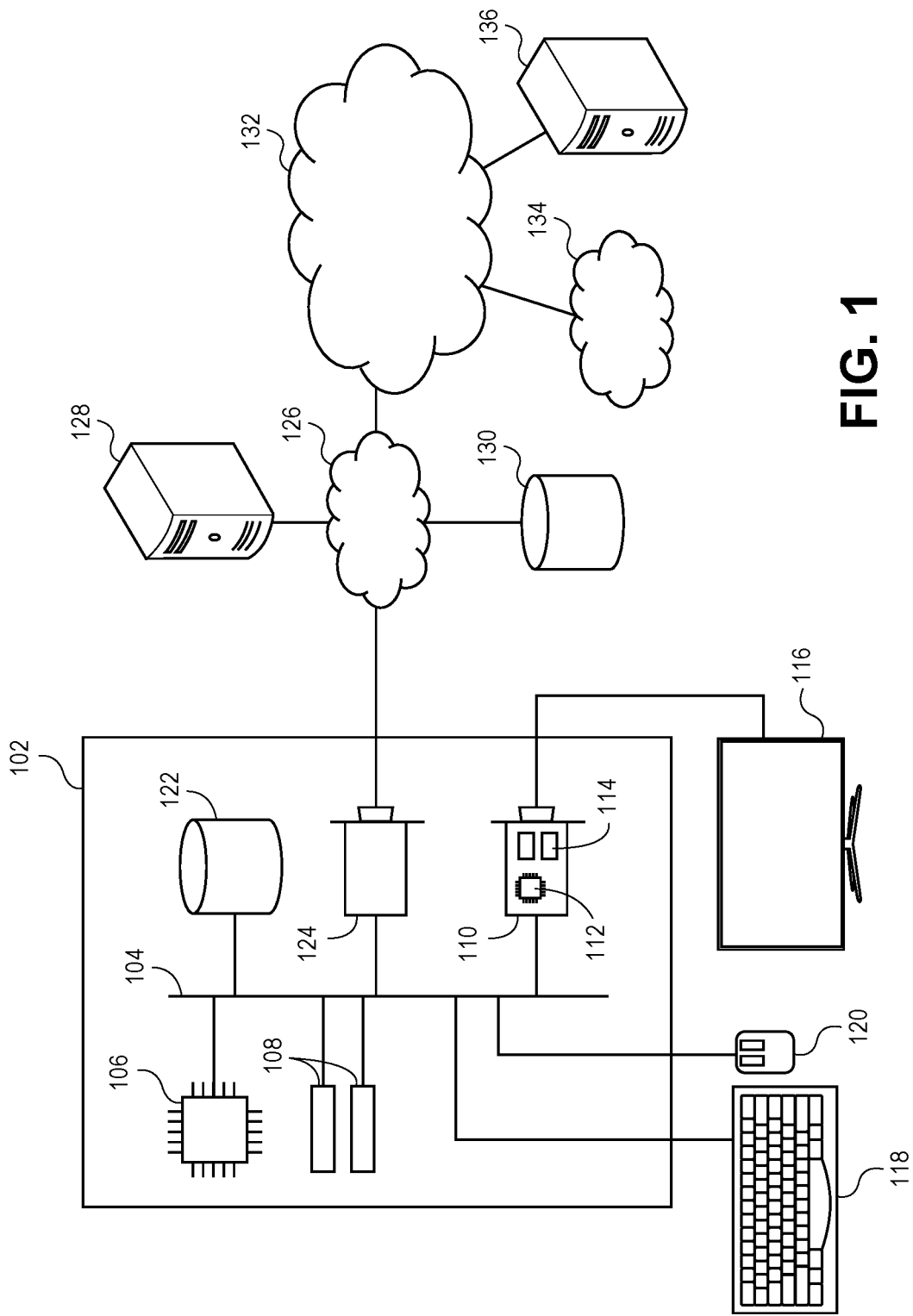
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "video live streaming" means streaming, substantially in real time, a video stream. In general, such a video stream may include a graphical background, one or more video streams, and other graphical layout components such as scrolling text, etc. Video live streaming may involve providing a proprietary or standardized video stream to a media provider, whose media platform may be leveraged to scale out a substantially live broadcast to a multitude of viewers of the live stream. Media providers include, inter alia, FACEBOOK, LINKEDIN, YOUTUBE, PERISCOPE, and TWITCH.

In some embodiments, a video stream may be produced for streaming to a virtual event hosting platform. As used herein a "virtual event hosting platform" means an immersive, interactive online conference-hosting platform. Such platforms allow meeting participants to view presentations, participate in event sessions, network online, exchange virtual business cards, and engage in networking opportunities while preserving a record of connections made while attending a virtual event. A virtual event hosting platform may also enable hosting of in-person events as well as hybrid events that are hosted both in-person and virtually (online). A "virtual event hosting system" is an instantiation of a set of technical resources that provide for hosting of one or more virtual events in a virtual event hosting platform. In some embodiments, distributed mixing of video for live streaming is employed to permit presenting users on a virtual event hosting platform to interact with each other in a low-latency, interactive manner to facilitate smooth, interactive dialogue. The video live stream may then be distributed by one or more virtual event hosting systems to any number of participants viewing one or more events on the virtual event hosting platform.

Embodiments of the invention are broadly directed to a shim for enabling dynamic switching between multiple RTC providers for virtual events. The RTC providers may be WebRTC providers. Virtual event participants may connect to the virtual event via the virtual event hosting platform. The virtual event hosting platform may be configured to implement real-time communications using an RTC provider. The shim may be used to intercept the outgoing signaling data from the virtual event hosting platform and apply a layer of abstraction, thereby allowing the signaling data to be read by the RTC provider. In some embodiments, the virtual event hosting platform is configured to dynamically select RTC providers based on various conditions, such as virtual event attendance. Embodiments herein may also be used to dynamically select an automatic speech recognition engine for use with the virtual event.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Such non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
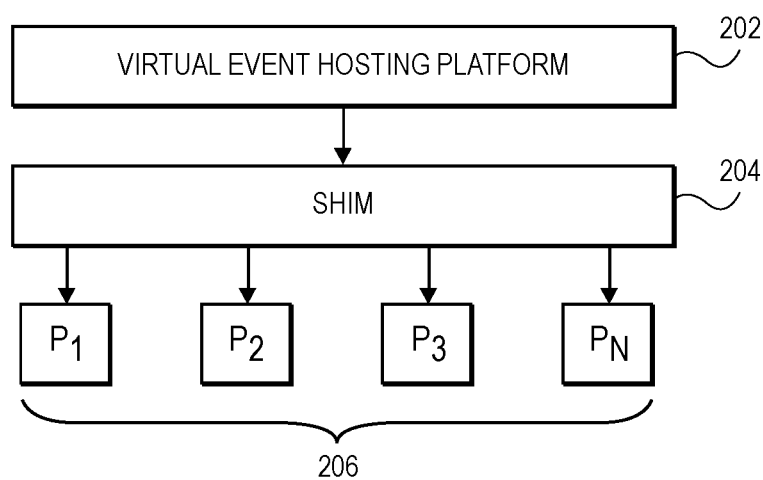
FIG. 2 depicts interactions between a virtual event hosting platform, a shim, and various RTC providers for some embodiments.

FIG. 2 illustrates a virtual event hosting platform 202, a shim 204, and providers 206 for some embodiments. As previously described, virtual event hosting platform 202 may facilitate purely virtual events (e.g., video conferences), in-person events, or hybrid events. Virtual event participants may access virtual event hosting platform 202 via a participant client device (e.g., computer 102). Virtual event participants may be classified into presenters and attendees. In some embodiments, a presenter is a virtual participant having a certain level of authorization rights for the virtual event. For example, a presenter may be a keynote speaker for a conference hosted on virtual event hosting platform 202 and may have authorization to share data to the conference (e.g., video and audio data, screen share a file, etc.). In some embodiments, an attendee is a virtual event participant having an authorization level below the presenter. Attendees may be able to view the virtual event via virtual event hosting platform 202 (e.g., via a user interface) but may not have authorization to share data thereto. Attendees may be able to interact with the virtual event via chat, polls, reactions, and the like. In some embodiments, participants may be promoted from attendees to presenters during the virtual event and vice versa. A virtual event capacity may represent the total number of virtual event participants connected to the virtual event.

Figure 3:
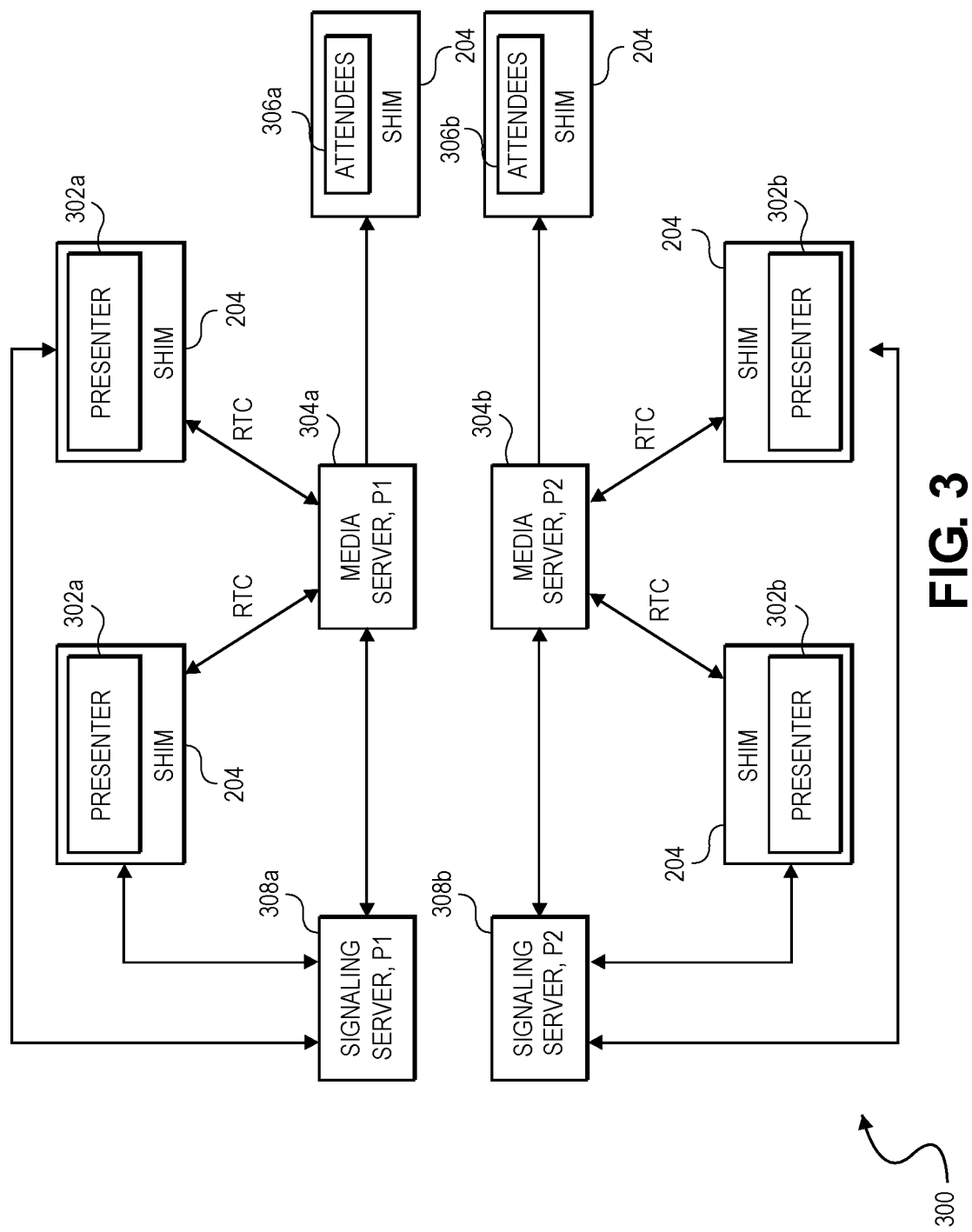
FIG. 3 depicts elements of a system for some embodiments.

To facilitate the real-time sharing of data between virtual event presenters, virtual event hosting platform 202 may implement RTC functionality. In some embodiments, virtual event hosting platform 202 is itself configured with RTC functionality. Virtual event hosting platform 202 may have associated signaling and/or media servers for carrying out real-time communications. In some embodiments, virtual event hosting platform 202 leverages one or more RTC providers 206 (hereinafter "providers") to facilitate real-time communication among presenters and/or between pretenders and attendees. As discussed below with respect to FIG. 3, presenters may be connected in a peer-to-peer mesh network or to a media server (e.g., a multipoint control unit or a selective forwarding unit) for distributing each presenter's data to the other presenters and to the attendees. In some embodiments, provider 206 provides an associated media server and/or an associated signaling server for facilitating RTC sessions. In some embodiments, providers 206 may include other functionality for virtual event hosting platform 202. For example, providers 206 may also comprise different automatic speech recognition (ASR) engines. As providers 206, ASR engines may be chosen dynamically based on engine cost, engine quality, engine speed, and various other qualities as discussed further below.

As previously mentioned, previous attempts to utilize multiple providers 206 and/or dynamically change providers 206 during a virtual event led to various inefficiencies and a poor experience for participants and event organizers. However, having the ability to select a provider 206 based on a state of the virtual event or a state of provider 206 allows for an optimal provider 206 to be selected for each virtual event hosted by virtual event hosting platform 202. Furthermore, switching providers 206 without having to rewrite the client system to communicate with the new provider 206 provides further advantages in efficiency and user experience. As an example, virtual event hosting platform 202 may be configured with RTC capabilities sufficient to host virtual events with 1,000 or fewer participants. If a virtual event is created in which 10,000 participants are expected to attend, virtual event hosting platform 202 may struggle to handle this number of participants. As such, virtual event hosting platform 202 may leverage an external provider 206 that is better suited to handle 10,000 participants. Additionally, selecting provider 206 and connecting presenters thereto may be done in real time if the number of participants changes from 1,000 to 10,000 as the event progresses. When using an external provider 206, virtual event hosting platform 202 must send RTC data thereto in a format understandable by the selected provider 206 (e.g., by using an API provided by provider 206).

While interfacing with a single or a small number of providers 206 may be feasible, as the number of available providers 206 increases, configuring virtual event hosting platform 202 with the ability to communicate with each of the providers 206 requires a substantial time and cost investment. Each provider 206 may utilize varying syntax and verbiage when implementing RTC, and virtual event hosting platform 202 must be able to correctly transmit data to each provider 206 in a way that the provider 206 understands. For example, for signaling to connect participants to provider 206, an API of a first provider 206 may refer to an RTC event as a "call" while an API of a second provider 206 may refer to an RTC event as a "session." Consequently, when sending signaling data from virtual event hosting platform 202 to a provider 206, the API calls must be those used by the specific provider 206.

To alleviate the burden associated with configuring virtual event hosting platform to work with a large number of providers 206, virtual event hosting platform 202 may implement shim 204. Shim 204 may be an API that is configured to receive (or intercept) outgoing API data from virtual event hosting platform 202 and translate it such that a provider 206 can interpret the data. As illustrated, shim 204 may be thought of as a separate layer between virtual event hosting platform 202 and providers 206. In some embodiments, shim 204 has an associated table storing information (e.g., syntax) for providers 206. When signaling data is intercepted by shim 204, shim 204 may perform a lookup and determine the correct verbiage to use to communicate with provider 206. In some embodiments, shim 204 is implemented using JavaScript, Python, Ruby, or any other programing language. Alternatively, or additionally, shim 204 may be written for Android, iOS, Linux, MacOS, Windows or any other operating system. In some embodiments, shim 204 is written for a web browser. In some embodiments, shim 204 is an API consumed by virtual event hosting platform 202. In some embodiments, virtual event hosting platform 202 is configured with multiple shims 204 and may comprise a shim 204 configured for each operating system (e.g., iOS, Android, Linux, etc.), for example.

By using shim 204, virtual event hosting platform 202 may leverage various providers 206 while maintaining a smooth user experience. Additionally, shim 204 may alleviate the need for virtual event hosting platform 202 to be rewritten when switching from a first provider 206 to a second provider 206. Because shim 204 simply intercepts outgoing signaling data from virtual event hosting platform 202, no change may be needed in the operation of virtual event hosting platform 202. As described above, use of shim 204 may enable virtual event hosting platform 202 to select providers 206 based on various states of the virtual event and dynamically change providers 206 during the virtual event. Further, virtual events may comprise participants that use differing providers 206 such that a first presenter for the virtual event utilizes a first provider 206 while a second presenter utilizes a second provider 206.

Dynamically changing providers 206 will now be discussed. Providers 206 may be switched based on a change associated with the virtual event, a change associated with provider 206, a change associated with a virtual event participant, or a combination thereof. As outlined in the above example, one reason to change providers 206 is based on the number of participants for the virtual event. As the number of participants changes over time, providers 206 may be switched. Providers 206 may leverage media servers to which presenter data is sent and distributed from. The media servers may have a max capacity (e.g., bandwidth) that they are able to handle before the virtual event quality is diminished. Consequently, when the number of participants exceeds or nears the capacity of the media server, the virtual event may switch to a new provider 206 better suited to handle the number of participants. Alternatively, or additionally, one or more additional providers 206 may be added in addition to the current provider as the number of participants increases to avoid server overload. Similarly, instead of adding a new provider 206, additional media servers from the current provider 206 may be requested to increase the overall capacity.

As another example, the operating system of the client device running virtual event hosting platform 202 may determine the selection of provider 206. Upon detecting a participant joining the virtual event using an unpreferred operating system, provider 206 may be switched to a provider 206 that does support the operating system.

As still another example, differences in endpoint support may cause a change in provider 206. For example, a first provider 206 may support only web clients. If an incompatible client connects to virtual event hosting platform 202, first provider 206 may be switched to a second provider 206 such that all clients may be supported. In some embodiments, all web clients are kept on first provider 206, while only unsupported clients are directed to the second provider 206.

Further still, costs associated with using a provider 206 may determine whether a provider 206 is switched. Some providers 206 may offer their services in tiers, wherein the cost to leverage their servers increases as the number of participants increases. Similarly, providers 206 may price their services based on a time of day or a length of use. Consequently, the costs associated with requisitioning a provider 206 may influence the selection of the provider 206. As one example, if a provider 206 provides their services for free for less than ten participants, the provider 206 may be selected when the number of participants is less than ten. However, if the number of participants increases above ten, the provider 206 may be switched to a different provider that costs less and/or provides better performance for the same cost.

Turning now to FIG. 3, a system 300 for implementing a virtual event is illustrated for some embodiments. System 300 provides a platform for interacting with one or more virtual event hosting systems. System 300 may comprise any number of first presenter client devices 302a and second presenter client devices 302b associated with presenters of the virtual event. First presenter client devices 302a may connect to a first media server 304a, and second presenter client devices 302b may connect to a second media server 304b. System 300 may also comprise first attendee client devices 306a and second attendee client devices 306b associated with attendees of the virtual event. Additionally, system 300 may comprise a first signaling server 308a associated with first media server 30a4, and a second signaling server associated with second media server 304b. First media server 304a and first signaling server 308a may be provided by a first provider 206 (e.g., P1), and second media server 304b and second signaling server 308b may be provided by a second provider 206 (e.g., P2).

For simplicity, system 300 may be described in relation to first presenter client devices 302a, first media server 304a, first attendee client devices 306a, and first signaling server 308a. However, it should be understood that second presenter client devices 302b may mirror presenter first client devices 302a, second media server 304b may mirror first media server 304a, second attendee client devices 306b may mirror first attendee client devices 306a, and second signaling server 308b may mirror first signaling server 308b. As described above, by utilizing shim 204, multiple providers 206 may be leveraged such that first presenter client devices 302a may switch to second media server 304b and second signaling server 308b, if necessary.

An individual user may connect to components of system 300 using a single client device or multiple client devices, either concurrently or sequentially. Similarly, in some embodiments, multiple users may share (concurrently or sequentially) a single client device to access the virtual event hosting system. As depicted in FIG. 3, client devices may be any form of computing device described above with respect to FIG. 1. A user may access components of system 300 using a desktop computer, a laptop computer, a mobile device, or any other form of computing device. Components of system 300 may be accessible via dedicated software of a particular client device or via a web browser associated with the client device. In some embodiments, event organizers and virtual event hosing system administrators can access administrative functionality via any client device. In other embodiments, administrative functions can only be accessed via a limited subset of client devices.

In some embodiments, a virtual event hosting system provides functionality in connection with media server 304a. Media server 304a may be a dedicated server, a shared server, a virtual machine instance in a cloud-computing environment, or any other form of computing device described above with respect to FIG. 1. Media server 304a may also be implemented in connection with containers (e.g., Docker-style containers) as provided by platform-as-as-service (PaaS) technologies with virtualized host operating systems or with any number of serverless PaaS technologies. In some embodiments, the RTC provider wrapped by shim 204 may be an external RTC provider and/or may be an RTC provider of virtual event hosting platform 202.

In some embodiments, the number of media servers 304a changes as the virtual event progresses. As described above with respect to changing providers 206, media servers 304a may change for similar reasons. If a new provider 206 is selected during the virtual event, the virtual event hosting platform 202 may signal the presenter client devices 302a and attendee client devices 306a (or a subset thereof) to switch to a new media server 304a associated with the new provider 206. Similarly, media servers 304a may be added as capacity of the virtual event increases.

In some embodiments, media servers 304a are added to provide scale, redundancy, and/or isolation between different instances of the virtual event hosting system. For example, an event organizer hosting a private virtual event in which event participants register for the event under a non-disclosure agreement may not wish to have its confidential virtual event hosted on the same system as another event organizer's virtual event hosting system for security reasons. In some embodiments, providers 206 may be selected based on offered security features for the virtual event.

As described above, the virtual event may comprise various presenter client devices 302a connected to media server 304a. Presenter client devices 302a may send data for the virtual event (e.g., audio/visual data) to media server 304a, whereby media server 304a may route the data to the other presenter client devices 302a and attendee client devices 306a. In some embodiments, media server 304a compiles and combines data from presenter client devices 302a before distributing the combined data as a single video stream (e.g., implemented as a multipoint control unit). In some embodiments, media server 304a is configured to forward data in packets from each presenter client device 302a to the other presenter client devices 302a and to attendee client devices 306a (e.g., implemented as a selective forwarding unit).

Presenter client devices 302a may be connected to media server 304a via an RTC connection. In order to connect to media server 304a, presenter client devices 302a may signal their connection information via signaling server 308a. As shown, signaling server 308a may be communicatively coupled to presenter client devices 302a and media server 304a. In some embodiments, signaling server 308a is integrated with media server 304a. As described above, signaling server 308a may be provided by the first provider 206 and the syntax for signaling connection information to signaling server 308a may vary from one provider 206 to the next.

Presenter client devices 302a and media server 304a may transmit their connection information to signaling server 308a. Once received, signaling server 308a may forward the connection information to the parties. Thereafter, presenter client devices 302a may connect to media server 304a. In some embodiments, the connection is initiated by presenter client devices 302a requesting to connect to the virtual event. In some embodiments, virtual event hosting platform 202 is configured such that presenter client devices 302a make the connection request upon entering the virtual event. Once the connection request is received, connection information for connecting to media server 304a is sent (e.g., via signaling server 308a) to presenter client device 302a. In some embodiments, the connection information comprises details on the selected provider 206 for the virtual event. For example, the connection information (e.g., the offer) may comprise the provider's name along with an authentication key or token granting permission for presenter client device 302a to connect to media server 304a. In some embodiments, the authentication key defines the authorization level for the virtual event participant.

Once the connection information for media server 304a is received by presenter client device 302a, presenter client device 302a may reply with their connection answer. The answer may comprise a signaling message comprising connection information (e.g., IP address, codecs, security information, etc.) for the presenter client device 302a. In some embodiments, the connection information is collected as a plurality of ICE (Interactive Connectivity Establishment) candidates comprising all available connection methods for connecting to presenter client device 302a. The signaling message may then comprise the plurality of ICE candidates. Once received, signaling server 308a may select the most efficient ICE candidate for connecting to presenter client device 302a. In some embodiments, the signaling message is sent by using at least one of a WebSocket, socket.io, HTTP requests, Session Initiation Protocol, or any other signaling means. The connection information may be formatted according to the Session Description Protocol (SDP). In some embodiments, signaling is performed by presenter client devices 302a in-band (i.e., single channel for signaling and sending data) or out-of-band (i.e., separate channels for signaling and sending data). By utilizing out-of-band signaling, an in-house signaling server 308a may be leveraged while using an external media server 304a from a provider 206. In some such embodiments, shim 204 may be used when the in-house signaling server 308a receives connection information from media server 304a. Shim 204 may intercept the connection information and translate it to the appropriate syntax used by signaling server 308a.

When presenter client device 302a sends the signaling message to signaling server 308a, the signaling message may be intercepted by shim 204. In some embodiments, because of the association between signaling server 308a and provider 206, it may be necessary to translate the internal verbiage used by virtual event hosting platform 202 running on presenter client devices 302a to the verbiage used by signaling server 308a in order to effectively communicate therewith. For example, if virtual event hosting platform 202 uses the term 'call' for describing an RTC event and signaling server 308a uses the term 'session' for describing an RTC event, shim 204 may change all arguments including 'callID' to 'sessionID' when transmitting the offer to signaling server 308a. As such, if a provider 206 is changed, shim 204 may allow for the client system running virtual event hosting platform 202 to not have to be rewritten if the syntax used by a new provider 206 is different from the old provider 206. Instead, shim 204 simply intercepts the outgoing signaling information, translates the necessary verbiage, and virtual event hosting platform 202 may connect to the new provider 206.

Shim 204 may also be used to connect participants from various non-RTC connections to the virtual event. In the event a presenter client device 302a does not support RTC, presenter client device 302a may still be added to the virtual event. Provider 206 may signal connection information to presenter client device 302a to connect to the virtual event using non-RTC means (e.g., telephony). Thereafter, presenter client device 302a may send an answer back. This answer may use the same verbiage as a signaling message for joining the virtual event with an RTC connection. Consequently, shim 204 may intercept the answer and translate it accordingly. Similarly, shim 204 may be configured to abstract outgoing signaling messages to connect multicasting and simulcasting clients to connect to the virtual event.

In some embodiments, data from presenter client devices 302a is transmitted to various auxiliary services in addition to media server 304a. For example, presenter client devices 302a may send data to a separate recording server for storing the data. Alternatively, media server 304a may be configured with recording functionality. In some embodiments, media server 304a is configured for simulcasting the virtual event and may adapt the bitrate, frame rate, bandwidth, or a combination thereof before transmitting the data to presenter client devices 302a and attendee client devices 306a. In some embodiments, presenter client devices 302a also send their data to one or more content delivery networks (CDNs) in the cloud. CDNs are geographically distributed networks of caching proxy servers in geographically distributed data centers. CDNs provide highly available and performant caching of media content by distributing corresponding media files and providing the media files geographically closer to requesting client devices. By using CDN, overall network bandwidth is conserved, performance is improved at client devices, and load is reduced at media server 304a. Users of the virtual event hosting system are provided with geographically proximate, cached access to virtual event media assets, thereby improving the user experience and reducing load on the virtual event hosting system.

As briefly described above, providers 206 may also comprise ASR engine providers. In some embodiments, the ASR engine is configured to analyze data for the virtual event and perform speech recognition. In some embodiments, the ASR engine is coupled to media server 304a and reads data received at media server 304a. The ASR engine may provide substantially real-time closed captioning services for the virtual event. Alternatively, or additionally, the ASR engine may be configured to analyze a recorded virtual event and perform ASR functionality thereon. For example, the ASR engine may generate captions, a virtual event summary, a transcript, and the like. The ASR engine may be configured to perform topic modeling using various natural language processing (NLP) techniques. As such, in some embodiments, virtual event hosting platform 202 may recommend virtual events to participants based on topics extracted by the virtual event. For example, if a user attends a subset of virtual events related to a singular topic, the virtual event hosting platform 202 may recommend an upcoming virtual event dedicated to the topic. ASR engines may be dynamically selected and replaced based on similar factors as described above with respect to selecting RTC providers. In some embodiments, an ASR engine is selected based in part on a known quality (e.g., recognition accuracy) of the ASR engine.

Figure 4:
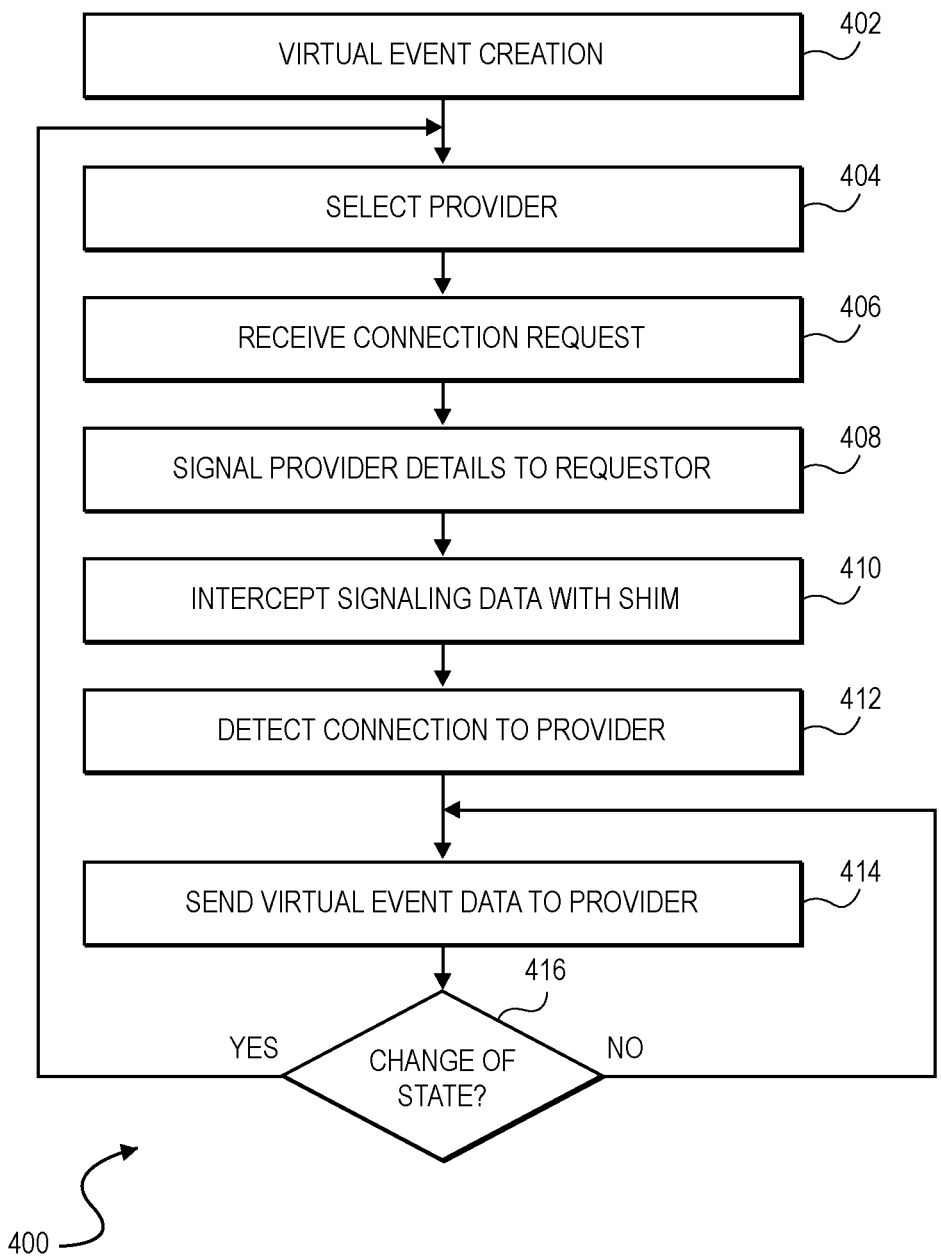
FIG. 4 depicts a flowchart illustrating the operation of a method for shim layer to enable interoperability between multiple RTC providers for some embodiments.

FIG. 4 illustrates an exemplary method 400 for utilizing shim 204 and dynamically selecting providers 206 for some embodiments. At step 402, the virtual event may be created. In some embodiments, the virtual event is created by a virtual event organizer via virtual event hosting platform 202. The virtual event organizer may configure the virtual event with various details, such as location, time, title, event type (e.g., in-person, virtual, hybrid), event topic/category, and the like. In some embodiments, the virtual event organizer sets an expected attendance for the virtual event. Alternatively, or additionally, the virtual event organizer may invite participants to attend the virtual event, and the expected attendance may be determined therefrom. In some embodiments, the virtual event organizer designates which participants are to serve as presenters for the virtual event.

Next, at step 404, one or more providers 206 for the virtual event may be selected. As described above, provider 206 may be an RTC provider capable of providing real-time communication for the virtual event. In some embodiments, provider 206 is internal to virtual event hosting platform 202. In some embodiments, selection of provider 206 is performed upon virtual event creation. Alternatively, or additionally, the video event organizer may manually select a provider 206. In some embodiments, selection of provider 206 is performed substantially near a scheduled start of the virtual event. By selecting provider 206 near to the virtual event start, provider 206 may be selected based in part on the number of participants of the virtual event. Further, other real-time variables (e.g., server availability, geographic location of presenters, etc.) may also be analyzed near event start for determining provider 206. In some embodiments, a provider 206 is initially selected upon event creation and, near the start of the virtual event, it is determined if the initially selected provider 206 can service the virtual event. If the initially selected provider 206 cannot service the event, a new provider 206 may be selected to replace or aid the initially selected provider. In some embodiments, virtual events are initiated with all participants connecting to virtual event hosting platform 202 and media servers associated therewith. Once all participants are connected and/or upon event start, a provider 206 may be selected and the participants may be migrated to the selected provider 206.

At step 406, a request to participate in the virtual event may be received. In some embodiments, the request comprises a signaling message sent to signaling server 308a. In some embodiments, the request is sent upon detection of presenter client device 302a connecting to virtual event hosting platform 202. Next, at step 408, details for provider 206 may be signaled to the requesting presenter client device 302a. In some embodiments, details for provider 206 comprise information on how virtual event participants may connect to media server 304a. For example, the details may comprise a provider name and connection details, such as an authentication key. The connection details may be sent from signaling server 308a to presenter client device 302a and formatted according to SDP.

Thereafter, at step 410, presenter client device 302a may send their signaling data to signaling server 308a. The signaling data may be intercepted by shim 204 and translated according to the selected provider 206. Once received by signaling server 308a, presenter client device 302a may connect to media server 304a and share data thereto for the virtual event. By intercepting data with shim 204, multiple providers 206 may be leveraged throughout the event while maintaining the internal consistency of virtual event hosting platform 202. Next, at step 412, presenter client device 302a may be connected to provider 206 via media server 304a. As such, at step 414, presenter client device 302a may send and receive virtual event data (audio, video, etc.) as part of the virtual event.

Lastly, at step 416, it may be determined if there is a change of state associated with the virtual event. As previously mentioned, providers 206 may be dynamically selected throughout the virtual event based on a state of the event. In some embodiments, the state of the virtual event is one of a number of participants, an endpoint of a presenter client device 302a, a cost of running media server 304a, virtual event bandwidth, and the like. If a change of state is detected, processing may proceed back to step 404 whereby a new provider 206 is selected. In some embodiments, the new provider 206 replaces the old provider 206. Once the new provider 206 is selected, the participants may disconnect from the old provider 206 and connect to the new provider 206, with the signaling message intercepted and translated by shim 204 as described above. In some embodiments, additional media servers 304a from provider 206 are requested handle additional server load. In some embodiments, the new provider 206 is used along with the old provider 206. If a change of state is not detected, processing may proceed back to step 414 whereby virtual event data for presenter client devices 302a is transmitted to media server 304a as part of the virtual event.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein, without departing from the scope of the invention as recited in the claims.

The invention claimed is:

1. One or more non-transitory computer-readable media storing computer-executable instructions that, when executed by a processor, perform a method of shimming signaling data to enable dynamic selection of WebRTC providers for a virtual event hosted by a virtual event hosting platform, the method comprising:
   providing a shim for the virtual event hosting platform;
   receiving, from a virtual event organizer, creation of the virtual event;
   selecting a WebRTC provider for the virtual event;
   receiving, from a presenter client device, a connection request to connect to the WebRTC provider;
   in response to receiving the connection request, signaling the presenter client device with connection information for connecting to the WebRTC provider;
   receiving, from the presenter client device, a signaling message, the signaling message based in part on the connection information;
   intercepting, by the shim, the signaling message;
   translating, by the shim, the signaling message from a first syntax to a second syntax to obtain a translated signaling message;
   transmitting the translated signaling message to a signaling server associated with the WebRTC provider, the signaling server configured to control a connection between the presenter client device and the WebRTC provider;
   detecting a change of state associated with the virtual event; and
   in response to detecting the change of state, selecting a new WebRTC provider for the virtual event.

2. The media of claim 1, wherein the change of state comprises a number of participants for the virtual event exceeding a capacity of the WebRTC provider.

3. The media of claim 1,
   wherein the presenter client device is a first presenter client device, and
   wherein the method further comprises:
      detecting a connection of a second presenter client device to the virtual event; and
      signaling the second presenter client device to connect to the new WebRTC provider.

4. The media of claim 3,
wherein the signaling message is a first signaling message, and
wherein the method further comprises:
receiving, from the second presenter client device, a second signaling message;
intercepting, by the shim, the second signaling message; and
translating, by the shim, the second signaling message from the first syntax to a third syntax to obtain a translated second signaling message.

5. The media of claim 1, wherein the method further comprises:
disconnecting the presenter client device from the WebRTC provider; and
connecting the presenter client device to the new WebRTC provider.

6. The media of claim 1,
wherein the WebRTC provider is an internal WebRTC provider for a virtual event hosting platform for the virtual event, and
wherein the new WebRTC provider is external to the virtual event hosting platform.

7. The media of claim 6,
wherein the change of state comprises a virtual event start, and
wherein the method further comprises migrating the presenter client device to the new WebRTC provider.

8. A system for shimming virtual event data for dynamic selection of WebRTC providers for a virtual event hosted by a virtual event hosting platform, the system comprising:
a processor; and
one or more non-transitory computer-readable media storing computer-executable instructions that, when executed by the processor, perform a method for shimming virtual event data for dynamic selection of WebRTC providers for the virtual event hosted by the virtual event hosting platform, the method comprising:
providing a shim for the virtual event hosting platform;
receiving, from a virtual event organizer, creation of the virtual event;
receiving, from a presenter client device, a connection request;
in response to receiving the connection request, signaling the presenter client device with connection information for connecting to a WebRTC provider;
receiving, from the presenter client device, a signaling message, the signaling message based in part on the connection information;
intercepting, by the shim, the signaling message;
translating, by the shim, the signaling message from a first syntax to a second syntax to obtain a translated signaling message; and
transmitting the translated signaling message to a signaling server associated with the WebRTC provider, the signaling server configured to control the connection between the presenter client device and the WebRTC provider.

9. The system of claim 8, wherein the method further comprises:
detecting a change of state associated with the virtual event; and
in response to detecting the change of state, selecting a new WebRTC provider for the virtual event.

10. The system of claim 9, wherein the change of state comprises a failure of the WebRTC provider.

11. The system of claim 8, wherein the method further comprises:
in response to receiving the creation of the virtual event, selecting the WebRTC provider for the virtual event.

12. The system of claim 11, wherein the method further comprises:
when the virtual event is scheduled to start, determining if the WebRTC provider can service the virtual event;
in response to determining the WebRTC provider cannot service the virtual event, selecting a new WebRTC provider; and
disconnecting the presenter client device from the WebRTC provider.

13. The system of claim 8,
wherein the shim is a first shim, and
wherein the method further comprises:
providing a second shim for the virtual event hosting platform;
selecting an automatic speech recognition engine for the virtual event; and
sending the signaling message through a second shim, the second shim configured to translate the signaling message from the first syntax to a third syntax for connecting to the automatic speech recognition engine.

14. The system of claim 8,
wherein the presenter client device is a first presenter client device and the WebRTC provider is a first WebRTC provider, and
wherein the method further comprises:
receiving a connection request from a second presenter client device;
determining that the second presenter client device is incompatible with the first WebRTC provider; and
in response to determining that the second presenter client device is incompatible with the first WebRTC provider, selecting a second WebRTC provider for the second presenter client device.

15. A method of shimming virtual event data to enable dynamic selection of WebRTC providers for a virtual event hosted by a virtual event hosting platform, the method comprising:
providing a shim for the virtual event hosting platform;
receiving, from a virtual event organizer, creation of the virtual event;
selecting a WebRTC provider for the virtual event;
receiving, from a presenter client device of a plurality of presenter client devices, a connection request to connect to the WebRTC provider;
in response to receiving the connection request, signaling the presenter client device with connection information for connecting to the WebRTC provider;
receiving, from the presenter client device, a signaling message, the signaling message based in part on the connection information;
intercepting, by the shim, the signaling message;
translating, by the shim, the signaling message from a first syntax to a second syntax to obtain a translated signaling message; and
transmitting the translated signaling message to a signaling server associated with the WebRTC provider, the signaling server configured to control the connection between the presenter client device and the WebRTC provider.

16. The method of claim 15,
wherein selecting the WebRTC provider for the virtual event is performed in response to the creation of the virtual event, and
wherein the method further comprises:
- substantially near a start of the virtual event, determining if the WebRTC provider can service the virtual event based on a number of virtual event participants; and
- in response to determining that the WebRTC provider is unable to service the virtual event based on the number of virtual event participants, selecting a new WebRTC provider for the virtual event.

17. The method of claim 16, wherein the method further comprises:
- detecting a connection of a new presenter client device to the virtual event; and
- signaling the new presenter client device with connection information for connecting to the new WebRTC provider.

18. The method of claim 15, wherein the WebRTC provider is selected based in part on a location of the presenter client device.

19. The method of claim 15, wherein the WebRTC provider is selected based in part on an operating system of the presenter client device.

20. The method of claim 15, wherein the method further comprises:
- determining a number of virtual event participants exceeds a capacity of the WebRTC provider; and
- in response to determining the number of virtual event participants exceeds the capacity of the WebRTC provider, requesting an additional media server from the WebRTC provider.

* * * * *